(12) United States Patent
Rojas-Cuevas et al.

(10) Patent No.: US 10,475,573 B2
(45) Date of Patent: Nov. 12, 2019

(54) INSTALLATION AND METHOD FOR WINDING AN ELONGATED FLEXIBLE INDUCTOR

(71) Applicant: Premo, S.A., Malaga (ES)

(72) Inventors: Antonio Rojas-Cuevas, Malaga (ES); Francisco Ezequiel Navarro-Perez, Malaga (ES); Claudio Canete-Cabeza, Malaga (ES); Francisco Garcia-Vacas, Malaga (ES)

(*) Notice: Subject to any disclaimer, the term of this patent is extended or adjusted under 35 U.S.C. 154(b) by 201 days.

(21) Appl. No.: 15/587,224

(22) Filed: May 4, 2017

(65) Prior Publication Data

US 2017/0323724 A1    Nov. 9, 2017

(51) Int. Cl.
| | | |
|---|---|---|
| H01F 41/064 | (2016.01) |
| H01F 41/096 | (2016.01) |
| B65G 15/16 | (2006.01) |
| H01F 27/28 | (2006.01) |
| H01F 41/073 | (2016.01) |
| H01Q 1/32 | (2006.01) |
| H01Q 7/08 | (2006.01) |

(52) U.S. Cl.
CPC ........... *H01F 41/064* (2016.01); *B65G 15/16* (2013.01); *H01F 27/2823* (2013.01); *H01F 41/073* (2016.01); *H01F 41/096* (2016.01); *H01Q 1/3241* (2013.01); *H01Q 7/08* (2013.01)

(58) Field of Classification Search
CPC .... H01F 41/064; H01F 41/073; H01F 41/096; B65G 15/16; H01Q 7/08
USPC .............................................. 242/447.3, 437
See application file for complete search history.

(56) References Cited

U.S. PATENT DOCUMENTS

| | | | | |
|---|---|---|---|---|
| 3,302,898 A | * | 2/1967 | Smith | B65H 81/08 156/195 |
| 3,643,326 A | * | 2/1972 | Boke | H02G 1/1258 140/92.2 |
| 3,932,254 A | * | 1/1976 | Comte | B29C 63/00 156/361 |
| 4,491,284 A | * | 1/1985 | Vazquez | H01F 41/096 242/362 |
| 4,747,557 A | * | 5/1988 | Fujimaki | B21C 47/20 242/362 |
| 9,446,466 B2 | * | 9/2016 | Arakawa | B23H 7/065 |

* cited by examiner

*Primary Examiner* — Emmanuel M Marcelo
(74) *Attorney, Agent, or Firm* — Eugenio J. Torres-Oyola; Victor M. Rodriguez-Reyes; Ferraiuoli LLC

(57) ABSTRACT

The present invention relates to an installation and method for winding an elongated flexible inductor, the proposed installation comprising a first conveyor (11) for moving the elongated flexible inductor (1) in a conveyance direction, supported on a conveyance surface (12); a retaining device (13) for fixing the flexible inductor (1) to said conveyance surface (12); winding means for winding a metallic lead wire (30) around a section of the flexible inductor (1) not supported on said conveyance surface (12), comprising at least one lead wire reel (31), a lead wire feed device (32) and a turning device (33), a holding device (20) provided for holding a portion of the already wound flexible inductor (1), being located opposite and spaced from the end of the first conveyor by a minimum predetermined distance, defining a winding area (50) susceptible to being accessed by said lead wire feed device (32); said turning device (33) causing the simultaneous turning of the first conveyor and of said holding device.

10 Claims, 4 Drawing Sheets

INSTALLATION AND METHOD FOR WINDING AN ELONGATED FLEXIBLE INDUCTOR

FIELD OF THE ART

The present invention is comprised in the field of keyless door opening or entry systems, which have a particular application in the automobile sector, in which they are also applied to controlling the electronic immobilizer for starting the engine. This "keyless" entry system (KES or also referred to as Passive Keyless Entry (PKE)) is based on the use of a remote control device emitting wireless signals and on the arrangement in the actual vehicle of 3 or more antennas the function of which is to detect the presence (by sensing the mentioned wireless signals) of the mentioned remote control device the user carries within a perimeter of 1.5 m or more around the vehicle. After said device is detected, the doors open or unlock, and the options of starting up and cutting off the engine, adjusting the rearview and side mirrors, adjusting the motor-operated seats, and switching on the courtesy light, among other possible functions, can also be enabled.

The use of elongated flexible inductors has recently been proposed, said inductors comprising a core made up of two or more rigid ferromagnetic cores or elements, connected to one another at their ends in an articulated manner, forming an oblong assembly that can bend without any risk for the inductor integrity, and having a coil made of a conductive element going around said composite core.

The described antenna with a flexible inductor allows replacing, by means of a single elongated flexible antenna, preferably of 30 cm in length or longer, said arrangement of three or more antennas inside the vehicle.

Said flexible property of the core and its dimensions cause it to bend during the winding operation, leading to an incorrect winding.

Therefore the present invention relates to an installation and method for winding an elongated flexible inductor.

STATE OF THE ART

Some flexible antenna solutions are known in this field of the art, such as those described in patent application WO-A2-2009123432, for example, which describes a solution having multiple rod-shaped cores inside a coil.

Another solution can be found in European patent application EP2996119.

Patent application US-A1-2013249303 discloses a plurality of aligned ferromagnetic elements, and patent application US-A1-20150295315 of SUMIDA describes rigid solid ferrite cores inserted in a coil forming device with a specific shape for providing capacitors and a waveguide.

Another solution can be found in patent application US-A1-2015123761 of SUMIDA based on a composite core made up of a plurality of rod-shaped ferrite cores (see FIG. 2) with a spherical concave or convex termination at the head and tail ends thereof, which are coupled to one another, and also discloses cores coupled to another in a book-like configuration (see FIG. 3).

Building elongated cores by means of adding longitudinally smaller elements coupled to one another was already known through patent application US-A1-2015123761.

Other documents disclosing composite inductors include patent US-B1-6417665, which describes a long magnetometer with a flexible magnetic core, built with several cores coupled to one another, and patent application EP-A2-0848577, which describes building a long and flexible magnetic core made of ferrite rods coupled at their ends. Furthermore, coupling at the ends of magnetic cores by means of spherical or cylindrical physical gaps or separations between contacting surfaces (air gap) is a common practice in magnetic rotating machines since they are required for assuring a constant and minimum air gap, as well as for free movement. See, for example the 1974 publication by Bruce De Palma "The generation of a unidirectional Force" (http//depalma.pair.com/GenerationOfUnidirectionalForce.html).

Patent application U.S. Pat. No. 7,138,896 describes ferrite cores made of individual elements coupled to one another in a head-tail-head manner by means of a cylindrical air gap for suppressing EMIs (Electromagnetic Interferences) in flat cables acting as an antenna giving off energy in the form of electromagnetic radiation.

JP 2007311530 discloses a coil winding apparatus to connect together a plurality of coils and comprises a winding spindle rotatable about the axis thereof and movable in the axial direction, a nozzle for supplying a wire to the winding spindle and movable in the axial direction of the winding spindle, and a chuck for defining the end of the coil upon the coil winding and for permitting the entry of the winding spindle after the coil winding. The coil wound about the winding spindle is successively received in the chuck, so that a plurality of coils is wound about the winding spindle in series.

However, none of the mentioned documents describes or proposes a solution for the problem of how to wind a lead wire onto an elongated flexible core (having a length of 30 cm or more), which can be wound with great difficulty by means of the conventional method in the field which consists of holding an overhanging end of the core to be wound in order to have free access to it from all sides.

BRIEF DESCRIPTION OF THE INVENTION

According to a first aspect, the present invention relates to an installation for winding an elongated flexible inductor.

By way of non-limiting example said flexible inductor is proposed to have a core formed by two or more rigid magnetic elements or magnetic cores, made of a ferromagnetic material, said magnetic cores being connected in an articulated manner to one another at their ends, forming an oblong assembly. Said magnetic cores will be coupled to one another such that the head end of a magnetic core is coupled, through contact surfaces, with a tail end of an adjacent magnetic core, forming an articulated attachment around a transverse axis, providing an adjustable, variable, flat chain link-like angled articulation. Additionally, the mentioned assembly of said two or more rigid magnetic cores will be surrounded by a flexible polymer sheath, which can include ferromagnetic loads which cooperate in preventing magnetic flux dispersion into the coupling areas or gaps between said magnetic cores.

The mentioned installation for winding will therefore allow winding a conductive element (metallic wire or conductive metal sheet) around a flexible inductor core, such as the one formed by two or more rigid magnetic elements or magnetic cores, for example, although the installation is understood as being applicable for flexible inductors other than the one described, so it can therefore likewise be applied to an elongated magnetic core like the one described in patent application EP2996119 belonging to PREMO.

Therefore, the installation for winding comprises, in a known manner:

a first conveyor for moving the elongated flexible inductor in a conveyance direction, supported on a conveyance surface of the conveyor;

retaining device for retaining the inductor on said conveyance surface;

winding means for winding a metallic lead wire around a section of the flexible inductor hanging over one end of the first conveyor, said winding means comprising at least one lead wire supply reel and a turning device.

Therefore, the first conveyor has a conveyance surface on which the flexible inductor is moved, and also has a retaining device keeping said flexible inductor in contact with said conveyance surface, keeping an overhanging end thereof susceptible to being accessed by the winding means and separated from the conveyor device.

Additionally, the proposed installation comprises in a novel manner a holding device provided for holding a portion of the already wound flexible inductor and allowing the movement thereof in the conveyance direction, said holding device being located opposite and spaced from the end of the first conveyor by a minimum predetermined distance, defining between the first conveyor and the holding device a winding area susceptible to being accessed by said lead wire feed device. The proposed installation also contemplates said turning device causing the simultaneous turning of the first conveyor, with its respective retaining device, and of said holding device around a central longitudinal axis of the flexible inductor in the extended position, without bending. Said central longitudinal axis is understood to be a geometric axis along the entire length of the flexible inductor in its longitudinal direction, passing through the geometric center of its section.

The mentioned turning causes the turning of the flexible inductor while it is being conveyed in the conveyance direction, at the same time the lead wire is fed to a portion of said flexible inductor located in the winding area. The combination of the turning and the movement of the flexible inductor, together with the feed of the lead wire, is what generates the winding.

The already wound portion of the flexible inductor is moved in the conveyance direction past the winding area, and is then grabbed by the holding devices, preventing the portion of the flexible inductor that is not held by the first conveyor from being able to bend.

Said winding area has a minimum distance that is sufficient for covering a given winding length of the wound lead wire during the forward movement of said flexible inductor from the conveyor in the conveyance direction.

Therefore, the proposed installation comprises a first conveyor device which integrates a retaining device, and comprises a holding device spaced from the end of the first conveyor by a minimum distance that is sufficient for the winding means to have free access to a portion of the flexible inductor held between the first conveyor and the holding device.

This installation therefore allows a flexible inductor to be fed to said conveyance surface of the first conveyor, to be retained on said conveyance surface while it is conveyed in the conveyance direction by means of said retaining device, and for an end of said flexible inductor to hang over the end of the first conveyor, entering a space that is susceptible to being accessed by the mentioned winding means that will wind a lead wire around the flexible inductor as said flexible inductor is conveyed forward in the conveyance direction by the first conveyor.

Since said inductor is flexible, having an excessively long overhanging portion would cause it to bend and would therefore cause an incorrect winding. For that reason, a holding device spaced from the end of the first conveyor has been provided in order to grab and fix the overhanging end of the flexible inductor after it is wound in the winding area defined in the space existing between the first conveyor and the holding device, thereby preventing the overhanging end from bending, and allowing a correct winding of the entire length of the flexible inductor.

In order to achieve a correct winding, the turning device is proposed to cause the simultaneous turning of the first conveyor, including the mentioned retaining device, and of the holding device, thereby achieving a controlled rotation of the flexible inductor.

According to a proposed additional non-limiting embodiment, the predetermined distance defining the winding area is about 10% of the total length of the flexible inductor. It is considered that this proportion assures that the bending caused in the overhanging end of the flexible inductor before reaching the mentioned holding device is not enough to disrupt the correct winding of the lead wire.

It is additionally proposed that the retaining device is formed by a first auxiliary conveyor, opposite said first conveyor, together forming a first double conveyor and trapping between both conveyor devices, in a sandwich-like manner, the section of the flexible inductor to be wound.

It is optionally considered that said first conveyor and/or said first auxiliary conveyor is formed by endless bands spanning between at least one drive roller and one driven roller.

The drive roller is understood to be a roller operated by means of an operating device, such as, for example, a motor or the like, and the driven roller is understood to be a freely rotating roller.

Said holding device preferably includes at least a second conveyor provided with a conveyance surface, and a retaining device provided for fixing the flexible inductor to said conveyance surface allowing the movement thereof in the conveyance direction.

Said retaining device associated with the second conveyor can be formed by a second auxiliary conveyor, for example.

Said second conveyor and/or said second auxiliary conveyor is also proposed to each be formed by endless bands spanning between at least one drive roller and one driven roller.

It is alternatively proposed that the holding device is formed by two opposite, freely rotating rolling means or, advantageously, motor-operated rotating rolling means, holding the section of the inductor during winding, trapped therebetween.

The proposed installation will furthermore generally integrate a device for winding the lead wire from the mentioned reel onto a surface of the flexible inductor to be covered.

The retaining devices, provided for fixing the flexible inductor to said conveyance surface, are also contemplated as being flexible and being able to adapt to the geometry and/or size of the flexible inductor, which allows better grip and traction thereof.

According to a second aspect, the present invention relates to a method for winding an elongated flexible inductor, such as the one described above.

The proposed method comprises, in a novel manner, the following steps:

a) holding a flexible inductor, by means of a first conveyor and a holding device, by two portions of its length separated from one another by a predetermined distance, an intermediate portion of said flexible inductor being located in a winding area;

b) feeding, by means of a lead wire feed device, a lead wire from a supply reel onto said intermediate portion of the flexible inductor housed in said winding area;

c) moving, by at least one conveyor, the flexible inductor in a conveyance direction keeping said two ends held; and d) turning the assembly of said first conveyor and said holding device during said steps b) and c).

References to geometric positions, such as for example parallel, perpendicular, tangent, etc., are understood as allowing deviations of up to ±5° with respect to the theoretical position defined by said nomenclature.

Other features of the invention will be described in the following detailed description of an embodiment.

BRIEF DESCRIPTION OF THE DRAWINGS

The foregoing and other advantages and features will be better understood from the following detailed description of an embodiment in reference to the attached drawings, which must be interpreted in an illustrative and non-limiting manner, in which:

FIG. 2 showing how said flexible inductor bends when it reaches an excessive overhanging length, causing imperfections in the winding;

DETAILED DESCRIPTION OF AN EMBODIMENT

Figure 1:
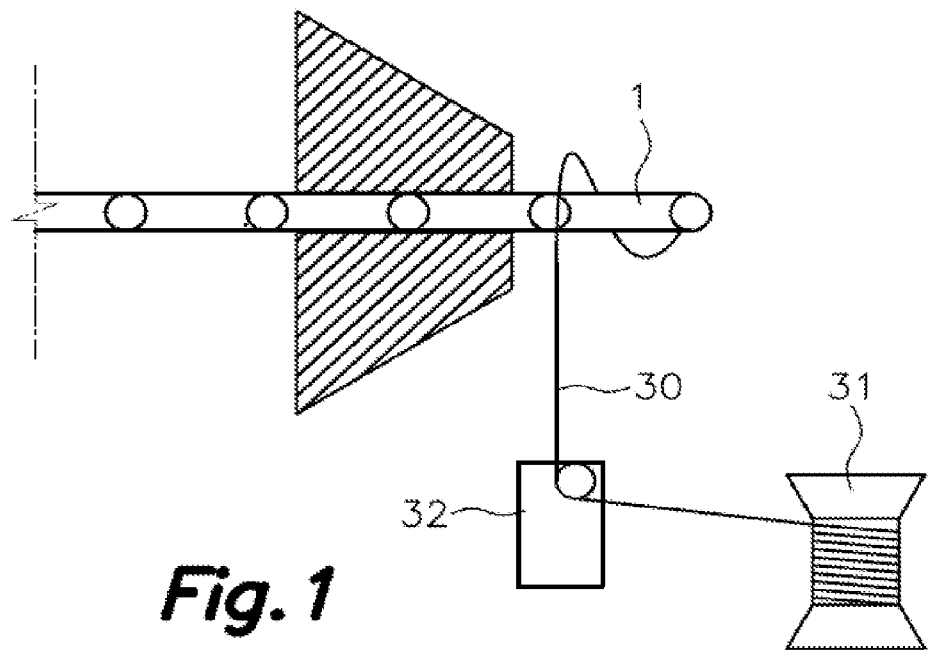
FIGS. 1 and 2 schematically show a sequence showing the existing technical problem when applying the winding technique known in the state of the art on a flexible inductor.
Figure 2:
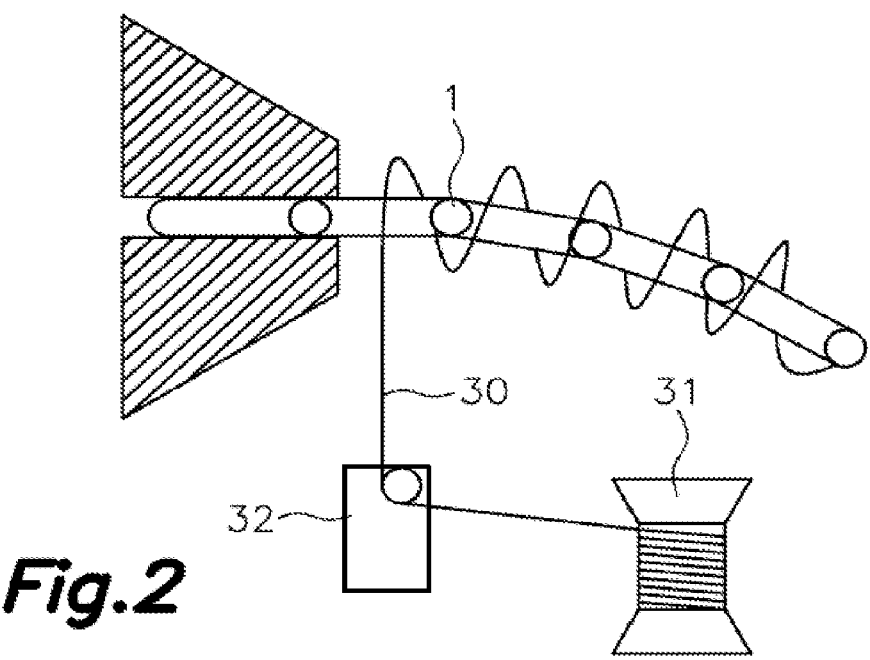

FIGS. 1 and 2 illustrate the technical problem the present invention solves. Said problem consists of a flexible inductor 1 bending while a lead wire 30 is being wound on it, said flexible inductor 1 being held such that it is overhanging. In said FIG. 2 it can be seen how the overhanging segment of the flexible inductor 1 bends when it reaches a given length, which can cause defects when the lead wire 30 is being wound on it.

Figure 3:
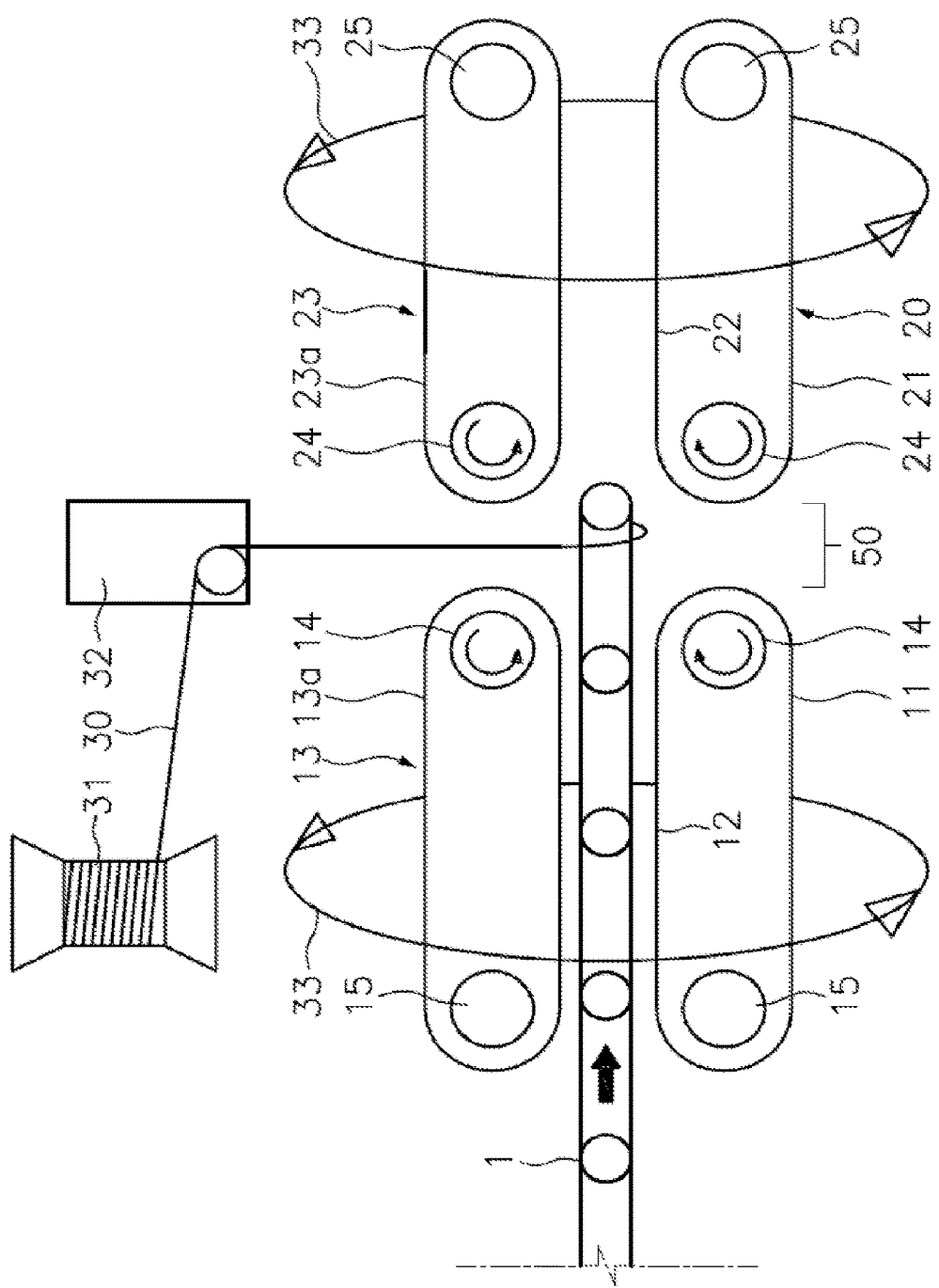
FIG. 3 schematically shows a first step for winding a flexible inductor, in which the flexible inductor to be wound is held by said first conveyor combined with its respective retaining device, which in this embodiment has a first auxiliary conveyor, while at the same time it is conveyed in a conveyance direction, there being an overhanging front end of the flexible inductor in a winding area existing between the first conveyor and a holding device, said winding area being susceptible to being accessed by a lead wire feed device; the curved arrows schematically indicate a turning device causing the rotation of the conveyors.
Figure 4:
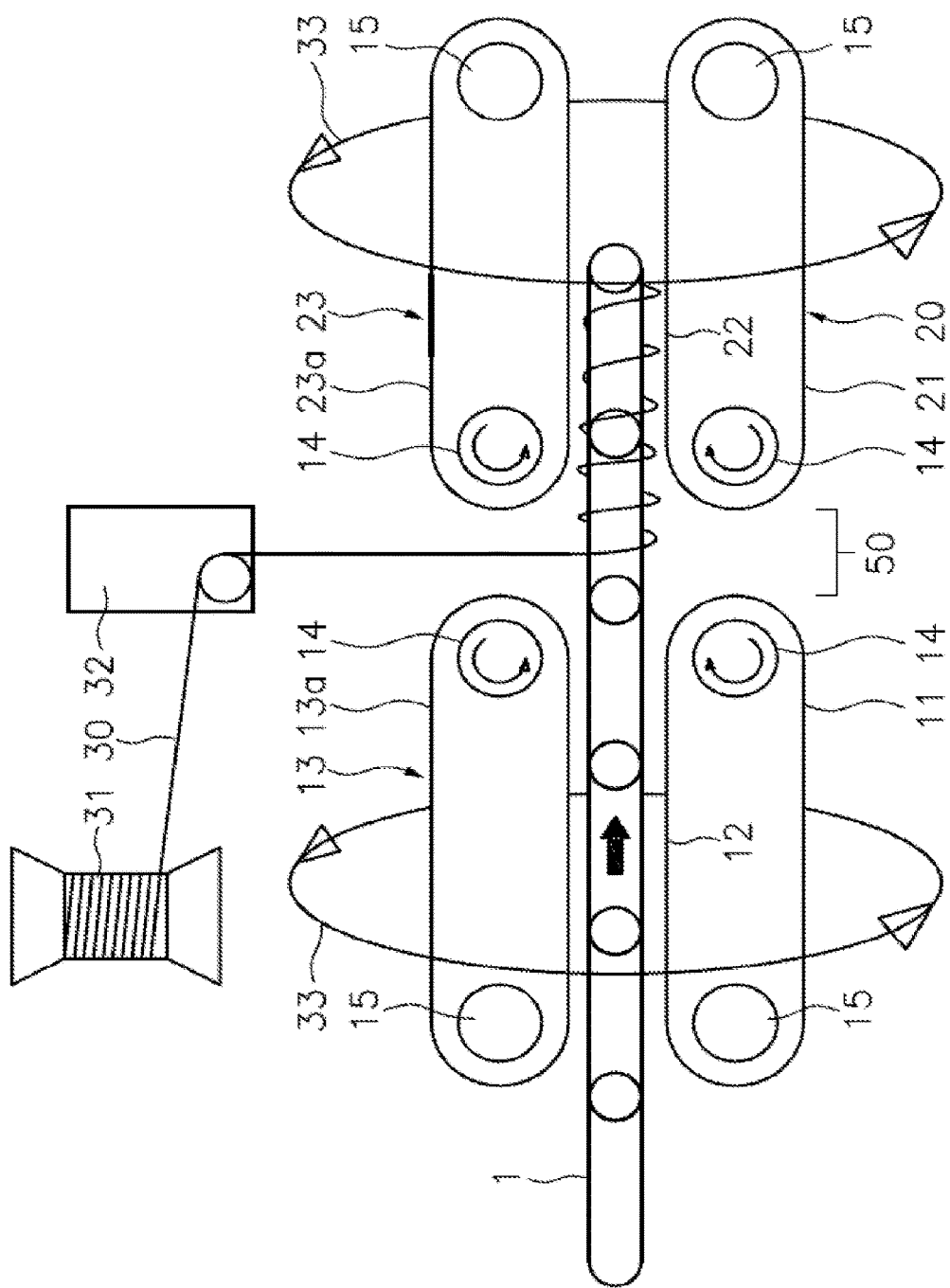
FIG. 4 schematically shows a second step of the winding after the first step shown in FIG. 3, in which the flexible inductor has been conveyed a distance in the conveyance direction, an already wound front end being retained by said holding device, while at the same time a portion of the still unwound flexible inductor is still supported by the first conveyor; the curved arrows schematically indicate a turning device causing the rotation of the conveyors.
Figure 5:
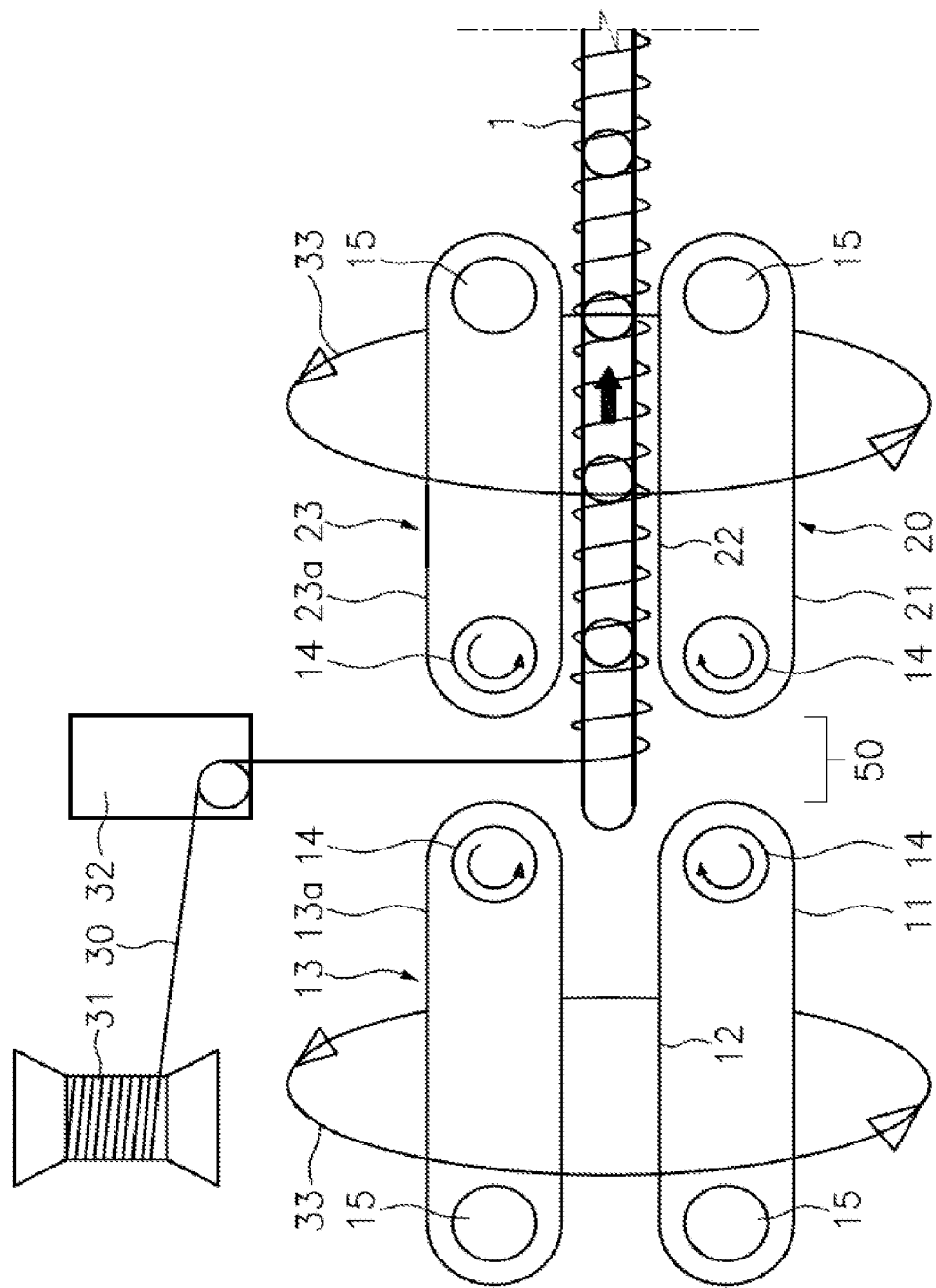
FIG. 5 schematically shows a third step of the winding after the second step shown in FIG. 4, in which the entire flexible inductor has already been wound, and is only supported by said holding device; the curved arrows schematically indicate a turning device causing the rotation of the conveyors.

Therefore, FIGS. 3, 4 and 5 show a non-limiting illustrative embodiment of an installation for winding an elongated flexible inductor 1 where the mentioned technical problem has been solved.

Said installation that is shown has a first conveyor 11 formed by an endless band spanning between a drive roller 14 and a driven roller 15, such that the rotation of the drive roller 14 causes the movement of the endless band like a conveyor belt, defining a conveyance direction.

One of the faces of said endless band determines a conveyance surface 12, intended for supporting a flexible inductor 1 to be wound. In order to assure that said flexible inductor 1 remains on said conveyance surface 12, while at the same time being allowed to move in a conveyance direction driven by said first conveyor 11, a retaining device 13 is provided opposite said conveyance surface 12.

In the present embodiment said retaining device 13 is envisaged as being a first auxiliary conveyor 13a, for example an endless band provided with a conveyance surface opposite the conveyance surface 12 of the first conveyor 11.

Therefore, the flexible inductor 1 to be wound is retained, in a sandwich-like manner, between two conveyance surfaces of two opposite and symmetrical endless bands, allowing said flexible inductor 1 to move in a conveyance direction, making a front end of the flexible inductor 1 hang over one end of said first conveyor 11.

A holding device 20 is provided for grabbing and holding the end of the flexible inductor 1 after the winding thereof, said holding device 20 being aligned with and spaced from the end of the first conveyor 11 in the conveyance direction.

In this embodiment, it is proposed that said holding device 20 is identical to the first conveyor 11 and that it is formed by a second endless band conveyor 21 with a conveyance surface 22 opposite a retaining device 23 also formed by an endless band defining a conveyance surface of a second auxiliary conveyor 23a, the end of the already wound flexible inductor being retained between the conveyance surfaces of the second conveyor 21 and of the second auxiliary conveyor 23a. Said endless bands span between a drive roller 24 and a driven roller 25 that are identical to those described in reference to the first conveyor 11.

There is a separation between the first conveyor 11 and the holding device 20 defining a winding area 50 in which the entire perimeter of a portion of the flexible inductor 1 is susceptible to being accessed, and where a lead wire feed device 32 supplies lead wire from a lead wire reel 31 to said portion of the flexible inductor 1 susceptible to being accessed located in the winding area 50.

It is furthermore envisaged that a turning device 33 causes the controlled and simultaneous rotation of the first conveyor 11, of the first auxiliary conveyor 13a, of the second conveyor 21 and of the second auxiliary conveyor 23a around an axis defined by the conveyance direction, thereby causing the rotation of the flexible inductor 1 held by said elements.

The rotation of the portion of the flexible inductor 1 susceptible to being accessed located in the winding area 50, combined with the movement of the flexible inductor 1 in the conveyance direction caused by the conveyors 11, 13a, 21, 23a, and the supply of lead wire 30 by the lead wire feed device 32 cause the winding of the lead wire 30 around the flexible inductor 1, such that the portion thereof which has passed through said winding area 50 has been wound by the lead wire 30.

The lead wire reel 31, the lead wire feed device 32, and the turning device 33 are part of winding means.

Preferably the distance of the separation defining the winding area 50 is equal to or less than 10% of the length of the flexible inductor 1 to be wound. For example, it is proposed that said distance is less than 3 cm.

This distance assures that there is no overhang of the flexible inductor 1 greater than said predetermined distance, preventing it from being able to cause the overhanging end of the flexible inductor 1 to bend before it reaches the holding device 20.

FIGS. 3, 4 and 5 also show different steps for manufacturing a wound flexible inductor 1, the intermediate step shown in FIG. 4 being the most relevant step since it is during this intermediate step that the flexible inductor 1 is held simultaneously at an unwound end by the first conveyor 11 and at an already wound end wound by the holding device 20.

The step shown in FIG. 3 shows an initial time when the flexible inductor 1 is only supported by the first conveyor 11 and there is an overhanging end in the winding area 50, where the winding has started but said overhanging end of the flexible inductor 1 still has not reached the holding device 20.

In contrast, the step shown in FIG. 5 shows a final time when the flexible inductor 1 has been almost completely wound and is entirely supported in the holding device 20, where one back end of the flexible inductor 1 hangs over in the winding area 50 and said back end is no longer supported by the first conveyor 11.

What is claimed is:

1. An installation for winding an elongated flexible inductor, comprising:
    a first conveyor (11) for moving, in a conveyance direction, the elongated flexible inductor supported on a conveyance surface (12) of the first conveyor (11);
    retaining devices (13) provided for fixing the flexible inductor (1) to said conveyance surface (12), allowing the movement thereof in the conveyance direction;
    winding means for winding a metallic lead wire (30) around a section of the flexible inductor (1) not supported on said conveyance surface (12) and hanging over one end of the first conveyor (11), said winding means comprising at least one lead wire reel (31), a lead wire feed device (32) and a turning device (33),
    characterized in that the installation further comprises:
        a holding device (20) provided for holding a portion of the already wound flexible inductor (1) and allowing the movement thereof in the conveyance direction, said holding device (20) being located opposite and spaced from the end of the first conveyor (11) by a minimum predetermined distance, defining between the first conveyor (11) and the holding device (20) a winding area (50) susceptible to being accessed by said lead wire feed device (32); and in that
        said turning device (33) causes the simultaneous turning of the first conveyor (11), with its respective retaining device (13), and of said holding device (20) around a central longitudinal axis of the flexible inductor (1), in the extended position, without bending wherein the holding device (20) is formed by two opposite, freely rotating or motor-operated rotating rolling means holding the section of the flexible inductor (1) during winding, trapped therebetween.

2. The installation according to claim 1, wherein the predetermined distance defining said winding area (50) is about 10% of the total length of the flexible inductor (1) to be wound.

3. The installation according to claim 1, wherein the retaining device (13) associated with the first conveyor (11) is formed by a first auxiliary conveyor (13a), opposite to said first conveyor (11), together forming a first double conveyor and trapping an unwound portion of the flexible inductor (1) between both conveyor devices (11 and 13a).

4. The installation according to claim 3, wherein said first conveyor (11) and/or said first auxiliary conveyor (13a) is formed by endless bands spanning between at least one drive roller (14) and at least one driven roller (15).

5. The installation according to claim 4, wherein the holding device (20) includes at least a second conveyor (21) provided with a conveyance surface (22), and a retaining device (23) provided for fixing the flexible inductor (1) to said conveyance surface (22) allowing the movement thereof in the conveyance direction.

6. The installation according to claim 5, wherein said retaining device (23) associated with the second conveyor (21) is formed by a second auxiliary conveyor (23a).

7. The installation according to claim 6, wherein said second conveyor (21) and/or said second auxiliary conveyor (23a) is formed by endless bands spanning between at least one drive roller (24) and one driven roller (25).

8. The installation according to claim 1, wherein the retaining devices (13) provided for fixing the flexible inductor (1) to said conveyance surface (12) are flexible and adaptable to the geometry and/or size of the flexible inductor (1).

9. A method for winding an elongated flexible inductor, comprising the following steps:
    a) holding the elongated flexible inductor (1), by a first conveyor (11) and a holding device (20), by two portions of its length separated from one another by a predetermined distance, an intermediate portion of said flexible inductor (1) being located in a winding area (50);
    b) feeding, by a lead wire feed device (32), a lead wire (30) from a lead wire reel (31) onto said intermediate portion of the elongated flexible inductor (1) housed in said winding area (50);
    c) moving, by at least the first conveyor (11), the elongated flexible inductor (1) in a conveyance direction; and
    d) turning said first conveyor (11) and holding device (20) during said steps b) and c).

10. The method according to claim 9, wherein step d) of turning the assembly comprises a rotation around a central longitudinal axis of the elongated flexible inductor (1), in the extended position, without bending.

* * * * *